(12) United States Patent
Edara et al.

(10) Patent No.: US 11,580,123 B2
(45) Date of Patent: Feb. 14, 2023

(54) COLUMNAR TECHNIQUES FOR BIG METADATA MANAGEMENT

(71) Applicant: Google LLC, Mountain View, CA (US)

(72) Inventors: Pavan Edara, Mountain View, CA (US); Mosha Pasumansky, Mountain View, CA (US)

(73) Assignee: Google LLC, Mountain View, CA (US)

(*) Notice: Subject to any disclaimer, the term of this patent is extended or adjusted under 35 U.S.C. 154(b) by 152 days.

(21) Appl. No.: 17/098,301

(22) Filed: Nov. 13, 2020

(65) Prior Publication Data
US 2022/0156260 A1 May 19, 2022

(51) Int. Cl.
G06F 16/2458 (2019.01)
G06F 16/22 (2019.01)
G06F 12/0875 (2016.01)

(52) U.S. Cl.
CPC ...... G06F 16/2465 (2019.01); G06F 12/0875 (2013.01); G06F 16/221 (2019.01); *G06F 2212/45* (2013.01)

(58) Field of Classification Search
CPC .............. G06F 16/2465; G06F 16/221; G06F 12/0875; G06F 2212/45
USPC ........................................................ 707/776
See application file for complete search history.

(56) References Cited

U.S. PATENT DOCUMENTS

| 2013/0060780 A1* | 3/2013 | Lahiri ............... H03M 7/42 707/E17.037 |
| 2014/0281247 A1* | 9/2014 | Loaiza ............. G06F 16/24552 711/126 |
| 2015/0089134 A1* | 3/2015 | Mukherjee ......... G06F 15/8007 711/114 |
| 2017/0091315 A1* | 3/2017 | Finlay ................. G06F 16/221 |
| 2017/0255675 A1* | 9/2017 | Chavan ............ G06F 16/24562 |
| 2017/0300515 A1 | 10/2017 | Finlay et al. |
| 2018/0089261 A1* | 3/2018 | Li ....................... G06F 16/2453 |
| 2020/0081841 A1* | 3/2020 | Samynathan ....... G06F 12/0859 |

OTHER PUBLICATIONS

International Search Report and Written Opinion, related to Application No. PCT/US2021/058686, dated Feb. 18, 2022.

* cited by examiner

*Primary Examiner* — Robert W Beausoliel, Jr.
*Assistant Examiner* — Arthur Ganger
(74) *Attorney, Agent, or Firm* — Honigman LLP; Brett A. Krueger

(57) ABSTRACT

A method for managing big metadata using columnar techniques includes receiving a query request requesting data blocks from a data table that match query parameters. The data table is associated with system tables that each includes metadata for a corresponding data block of the data table. The method includes generating, based on the query request, a system query to return a subset of rows that correspond to the data blocks that match the query parameters. The method further includes generating, based on the query request and the system query, a final query to return a subset of data blocks from the data table corresponding to the subset of rows. The method also includes determining whether any of the data blocks in the subset of data blocks match the query parameters, and returning the matching data blocks when one or more data blocks match the query parameters.

20 Claims, 10 Drawing Sheets

| System Table 154a | | |
|---|---|---|
| Data Block ID 310a | Data Block Creation 310b | Data Block Death 310c |
| Data Block 152a ID | 2020-05-20 08:13:06 | 2020-10-13 22:54:07 |
| Data Block 152b ID | 2020-05-08 14:37:58 | 2020-06-02 15:37:22 |
| Data Block 152c ID | 2019-12-29 02:41:16 | 2020-01-03 20:43:33 |
| ... | ... | ... |
| Data Block 152n ID | 2009-02-19 06:22:24 | 2014-12-22 10:41:05 |

FIG. 3A

| System Table 154b | | |
|---|---|---|
| Data Block ID 310a | Total Rows 310d | Total Missing Rows 310e |
| Data Block 152a ID | 10,447 | 11 |
| Data Block 152b ID | 223,372,036 | 3,524 |
| Data Block 152c ID | 775,808,625,381 | 8,188 |
| . . . | . . . | . . . |
| Data Block 152n ID | 180,948 | 7,350 |

FIG. 3B

COLUMNAR TECHNIQUES FOR BIG METADATA MANAGEMENT

TECHNICAL FIELD

This disclosure relates to the management of large quantities of metadata using columnar techniques.

BACKGROUND

As distributed storage (i.e., cloud storage) becomes increasingly popular, performance metrics for very large datasets has also become increasingly important. For example, when querying a very large table (e.g., a table multiple petabytes in size or larger) millions or more entries are often scanned to successfully respond to the query. In this scenario, the query can take a significant amount of time to complete. Using metadata to locate entries can speed up this process, but as the amount of metadata increases, performance is degraded SUMMARY One aspect of the disclosure provides a method for using columnar techniques for big metadata (i.e., large quantities of metadata) management. The method includes receiving, at data processing hardware, a query request requesting the return of any data blocks from a data table that match query parameters. The data table is stored on memory hardware in communication with the data processing hardware and associated with one or more system tables, where each of the one or more system tables has rows that each include metadata for a corresponding data block of the data table. The method also includes generating, by the data processing hardware, based on the query request, a system query. The system query returns a subset of rows selected from the rows of the one or more system tables that include the metadata for the corresponding data blocks of the data table that match the query parameters of the query request. The method further includes generating, by the data processing hardware, based on the query request and the system query, a final query. The final query returns a subset of data blocks from the data table that corresponds to one of the rows in the subset of rows. The method also includes determining, by the data processing hardware, whether any of the data blocks in the subset of data blocks match the query parameters indicated by the query request, and returning, by the data processing hardware, the matching date blocks when one or more data blocks in the subset of data blocks matches the query parameters.

Implementations of the disclosure may include one or more of the following optional features. In some implementations, generating the final query includes generating a semi-join of the query request and the system query. In some examples, the system query includes one or more falsifiable expressions. In these examples, generating the system query includes generating, for at least one conjunct of the query request, a falsifiable expression.

In some implementations, the data table includes a fact table (e.g., a large fact table) and a dimension table (e.g., smaller than the fact table), where the query request filters the dimension table. In these implementations, the method further includes generating, by the data processing hardware, based on the query request, a fact query that filters the fact table. In some examples, generating the final query that returns the subset of data blocks from the data table is interleaved with determining whether any data blocks in the subset of data blocks match the query parameters. In some implementations, a portion of the one or more system tables is cached in volatile memory. These implementations may further include, determining, by the data processing hardware, based on access statistics, the portion of the one or more system tables cached in the volatile memory. In some examples, the data table is stored in a column major format.

Another aspect of the disclosure provides a system for using columnar techniques for big metadata management. The system includes data processing hardware and memory hardware in communication with the data processing hardware. The memory hardware stores instructions that when executed on the data processing hardware cause the data processing hardware to perform operations. The operations include receiving a query request requesting the return of any data blocks from a data table that match query parameters. The data table is stored on the memory hardware and is associated with one or more system tables, where each of the one or more system tables has rows that each include metadata for a corresponding data block of the data table. The operations also include generating, based on the query request, a system query. The system query returns a subset of rows selected from the rows of the one or more system tables that comprise the metadata for the corresponding data blocks of the data table that match the query parameters of the query request. The operations further include generating, based on the query request and the system query, a final query. The final query returns a subset of data blocks from the data table that corresponds to one of the rows in the subset of rows. The operations also include determining whether any of the data blocks in the subset of data blocks match the query parameters indicated by the query request, and returning the matching date blocks when one or more data blocks in the subset of data blocks matches the query parameters.

This aspect may include one or more of the following optional features. In some implementations, generating the final query includes generating a semi-join of the query request and the system query. In some examples, the system query includes one or more falsifiable expressions. In these examples, generating the system query includes generating, for at least one conjunct of the query request, a falsifiable expression.

In some implementations, the data table includes a fact table and a dimension table, where the query request filters the dimension table. In these implementations, the operations may further include generating, based on the query request, a fact query that filters the fact table. In some examples, generating the final query that returns the subset of data blocks from the data table is interleaved with determining whether any data blocks in the subset of data blocks match the query parameters. In some implementations, a portion of the one or more system tables is cached in volatile memory. These implementations may further include, determining, based on access statistics, the portion of the one or more system tables cached in the volatile memory. In some examples, the data table is stored in a column major format.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 3A and 3B are schematic views of exemplary system tables.

FIGS. 4A and 413 are schematic views of exemplary timelines of data block timestamps.

Like reference symbols in the various drawings indicate like elements.

DETAILED DESCRIPTION

Rapid emergence of cloud data warehouses is redefining the landscape of data analytics. With the growth of data volumes, such systems must scale to increasingly larger sizes (e.g., petabytes or exabytes) today and in the near future. Many techniques have evolved to allow data systems to handle such extreme storage requirements. Commonly, these techniques include increasing an amount of metadata stored as the number of data objects grows. Big data systems can exploit rich metadata about individual data blocks to perform low latency data analysis. Thus, it would seem that storing more metadata should generally lead to increased performance and reduced latency. However, traditionally, big data systems have attempted to reduce the amount of metadata in order to scale the system better while making a corresponding sacrifice in performance, because as the size of the metadata grows, the scalability, manageability, and performance of the metadata system degrades the overall behavior of the system.

In some data systems, data blocks are stored in data tables as a collection of columnar blocks (i.e., in a column-major format). Metadata may be stored in one or more system tables that are associated with data blocks of a data table For example, the metadata includes the table schema and block locations (e.g., as paths) of the data blocks of the data table. Queries over the data table tend to have filters on one or more columns of the table. Furthermore, star and snowflake schemas are common. Queries over such tables (e.g., data tables with star or snowflake schemas) have implied filter predicates that the data system generates after processing dimension tables of the data table.

It is clear that reducing the number of rows that must be scanned in the data table is key to efficiency and latency for queries of the data table. Storing rich metadata about each block improves query performance significantly, but as the size of the data table increases, the amount of metadata can increase dramatically. While big data systems have traditionally tried to reduce the amount of metadata in order to scale, reducing the amount of metadata sacrifices performance that rich metadata could otherwise provide.

Implementations herein are directed toward a system that manages big metadata using columnar techniques without attempting to reduce the amount of metadata and instead allowing the metadata to scale with the data table. Big metadata is defined as massive or vast amounts of metadata (e.g., terabytes or petabytes or more). The system receives a query for the data table to generate a system query over one or more system tables. Each system table includes rows with metadata associated with the data blocks of the data table. The system query of the system table(s) produces a result that greatly filters the number of data blocks from the data table that must be scanned to respond to the query.

Figure 1:
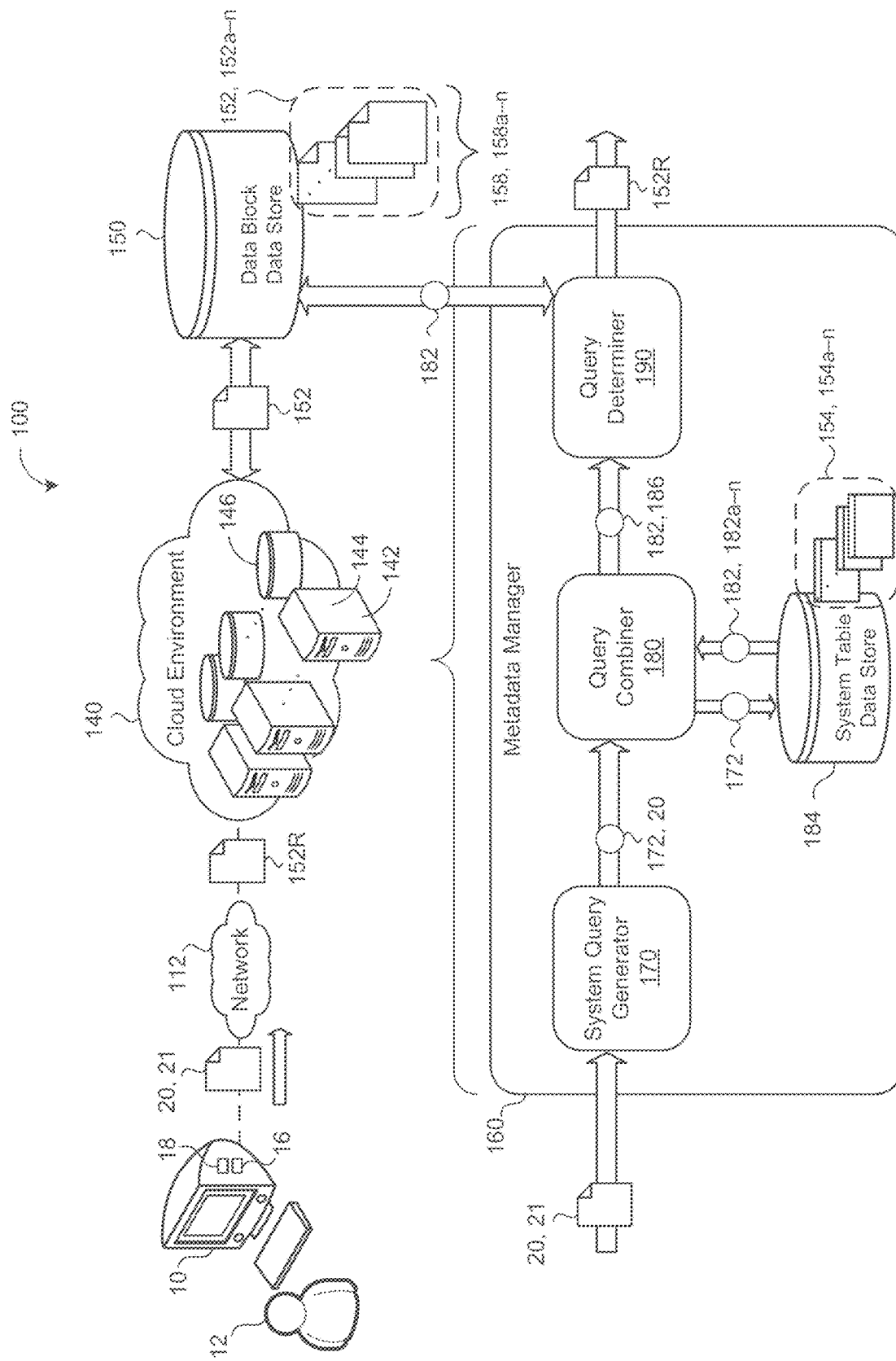
FIG. 1 is a schematic view of an example system for managing big metadata using columnar techniques.

Referring to FIG. 1, in some implementations, an example system 100 includes a user device 10 associated with a respective user 12 in communication with a remote system 140 via a network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware).

The remote system 140 may be a single computer, multiple computers, or a distributed system (e.g., a cloud environment) having scalable/elastic computing resources 144 (e.g., data processing hardware) and/or storage resources 142 (e.g., memory hardware). A data store 146 (i e, a remote storage device 146) may be overlain on the storage resources 142 to allow scalable use of the storage resources 142 by one or more of the client or computing resources 144. The data store 146 includes a data block data store 150 configured to store a plurality of data blocks 152, 152a-n stored within a data structure 158 (e.g., a data table) associated with the user 12. The data block data store 150 may store any number of data tables 158, 158a-n. In some implementations, the data blocks 152 are stored in the data table 158 in a column-major format. The remote system 140 also includes a system table data store 184 configured to store one or more system tables 154, 154a-n. Each system table 154 is associated with the data table 158, and each row 210 (FIG. 2) of each system table includes metadata that corresponds with a specific data block 152 of the data table 158. Each system table uses columnar storage (i.e., metadata is stored by column rather than by row).

The remote system 140 is configured to receive a query request 20 from the user 12 on the user device 10 via the network 112. The query request 20, for example, includes a request to return any data blocks 152R that match query parameters 21 included within the query request 20 (e.g., data blocks 152 that contain a certain keyword. Typically, to complete the query request 20, each data block 152 in the data table 158 must be scanned or read to determine if the respective data block 152 matches the query parameters 21 of the query request 20. The remote system 140 executes a metadata manager 160 that receives the query request 20 with the query parameters 21. The metadata manager 160, in some implementations, includes a system query generator 170. The system query generator 170 generates a system query 172 based on the received query request 20. For example, the system query generator 170 generates the system query 172 based on the query parameters 21 of the query request 20. As will be discussed in more detail below, the system query generator 170 generates the system query 172 to return part or all of a subset of rows 210, 210a-n (FIG. 2) from one or more of the system tables 154. Each row corresponds to one of the data blocks 152 in the data table 158. That is, each row contains metadata associated with one of the data blocks 152 of the data table 158.

The metadata manager 160 also includes a query combiner 180. After generating the system query 172, the system query generator 170 sends the system query 172 and the query request 20 to the query combiner 180. The query combiner 180 is configured to receive the query request 20 and the system query 172 and generates a final query 186 based on the query request 20 and the system query 172. To this end, the query request 20 and the system query 172 are sub-queries of the final query 186. In some implementations, the final query 186 is a semi-join of the query request 20 and the system query 172. A join is a table operator used to combine columns from one or more tables. A semi-join is a table operator where the result-set contains only columns from a "semi-joined" table. Put another way, a semi-join returns a row from one join input if there is at least one matching row on the other join input. In some examples, the query combiner 180 evaluates the semi-join of the query request 20 with one or more system tables 154 over an addressing column such as a BLOCK LOCATOR column. The addressing column provides an address (i.e., a location) for each data block 152 in the data table 158.

The query combiner 180 queries one or more of the system tables 154 in the system table data store 184 using the system query 172 generated by the system query generator 170. The system query 172 scans the corresponding system tables 154 and returns portions or all of a subset of rows 210 (FIG. 2) of the system tables 154. For example, the query combiner 180 retrieves data block IDs 182, 182a-n for the subset of rows 210 from the one or more system tables 154. These data blocks 152, because the system query 172 is based on the query request 20, correspond to a superset of data blocks 152 that match the query parameters 21 of the query request 20. The query combiner 180 uses the output data block IDs 182 (or any other identifiable aspect of the data blocks 152) generated by the system query 172 in the final query 186 to filter the data blocks 152 scanned for the query request 20. In other words, only the data blocks 152 (i.e., identified by the data block IDs 182) returned by the system query 172 are processed by final query 186. Thus, instead of scanning every data block 152 of the data table 158, the final query 186 scans only the data blocks 152 indicated or identified by the system query 172, thus reducing the total number of data blocks 152 scanned and thereby reducing processing time and latency. For some query requests 20, the number of data blocks 152 produced by the system query 172 is several orders of magnitude less than the total number of data blocks 152 of the data table 158.

Figure 2:
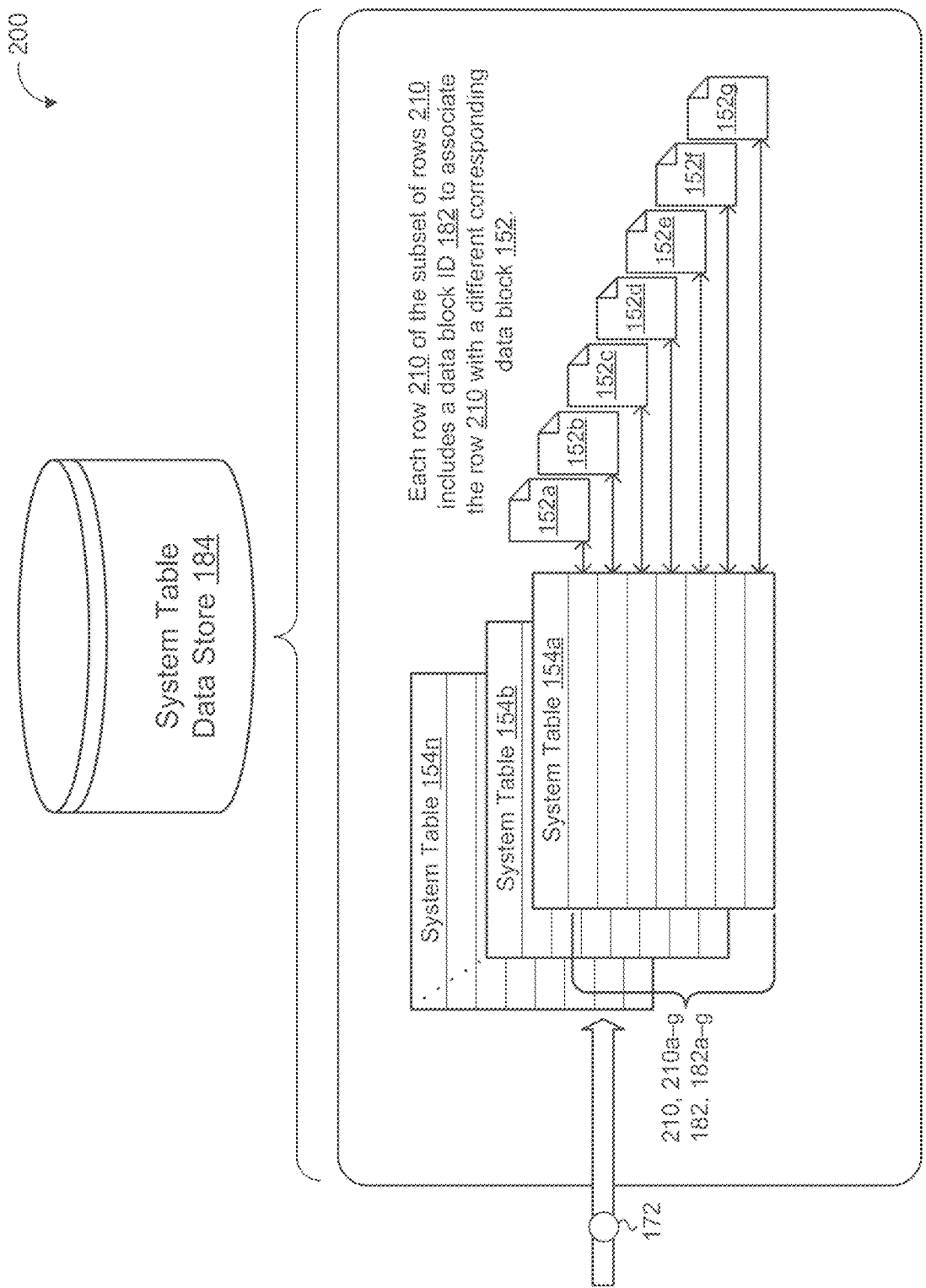
FIG. 2 is a schematic view of an example component of the system of FIG. 1.

Referring now to FIG. 2, a schematic view 200 includes the system query 172 identifying the subset of rows 210 in the one or more system tables 154 stored in the system table data store 184. Each row 210 corresponds to a data block 152 of the data table 158 and the subset of rows 210 encompasses all of the data blocks 152 that match the query parameters 21 of the query request 20. That is, each row 210 includes metadata associated with one data block 152 of the data table 158.

Here, the system query 172 identifies the subset of rows 210a-g as rows 210 that include the data blocks 152 the query request 20 seeks. Accordingly, each row 210 in the subset of rows 210a-g includes a corresponding data block ID 182a-g that associates the row 210 with the corresponding data blocks 152a-g. Specifically, the data block ID 182a identifies the data block 152a and associates the row 210a with the data block 152a Similarly, the data block ID 182b identifies the data block 152b and associates the row 210b with the data block 152b. This continues for each row 210 in this example, the last row 210g includes the data block ID 182g with identifies the data block 152g and associates the row 210g with the data block 152g. System tables 154 may include any number of rows 210 and the number may instead be based on the number of data blocks 152 in the data table 158. In some examples, the number of rows 210 is in the millions. Thus, the metadata manager 160 uses the data block IDs 182 representing a superset of data blocks 152 that match the query parameters 21 of the query request 20 to minimize the amount of processing (i.e., the number of data blocks 152 to scan) necessary to determine which of the data blocks 152 matches the query parameters 21 of the query request 20.

Referring back to FIG. 1, the metadata manager 160 includes a query determiner 190 that receives the final query 186 that includes the query parameters 21 and includes or identifies the data block IDs 182 determined by the system query 172. The query determiner 190 queries the data block data store 150 with the final query 186 to read or scan or return the subset of data blocks 152 that correspond to the data block IDs 182 returned by the system query 172. The query determiner 190 determines the data blocks 152R from the subset of data blocks 152 identified by the system query 172 that match the query parameters 21 indicated by the query request 20. For example, the query determiner 190 scans each of the data blocks 152 that correspond with the data block IDs 182 generated by the system query 172. The query determiner 190 returns any data blocks 152R matching the query parameters 21 (e.g., contain the matching keyword(s)) of the query request 20 to the user device 10.

In some implementations, the query parameters 21 of the query request 20 are non-selective (e.g., do not include a snapshot timestamp or other filter). In these implementations, the system query 172 returns a large number of rows 210 represented by data block IDs 182. To speed up processing, generating the final query 186 that returns the subset of data blocks 152 from the data table 158 may be interleaved with determining which of the data blocks 152 in the subset of data blocks 152 matches the query parameters 21 of the query request 20. In other words, as the system query 172 is returning rows 210 with data block IDs 182, the query determiner 190 executes the final query 186 including the query request 20 in parallel to determine whether any of the data blocks 152 in the subset of data blocks 152 matches the query parameters 21 of the query request 20. That is, the query combiner 180 may return the data block IDs 182 to the query determiner 190 in batches that allows the query determiner 190 to begin processing the final query 186 prior to the query combiner 180 completing the retrieval of all of the corresponding data block IDs 182. For example, when a system query 172 (based on the query request 20) results in a large number of rows 210 from the system table 154, distributed processing techniques such as interleaving execution improves performance of the query request 20.

FIGS. 3A and 3B include example system tables 154a, 154b that each includes a subset of rows 210a-n and associated columns 310, 310a-n of metadata. The number of rows 210 and columns 310 depicted by the system tables 154a, 154b in FIGS. 3A and 3B are exemplary, and the system tables 154a, 154b may include any number of rows 210 and any number of columns 310. Each "cell" of the system table 154 (i.e., each intersection of a row 210 and a column 310) includes metadata 300 associated with a corresponding data block 152. The metadata 300 of each column 310 may include any type of metadata 300. The types of metadata 300 for each system table 154 may be tailored according to the data blocks 152 the system table 154 is associated with. For example, the types of metadata 300 for a system table 154 representing sales data (e.g., for a retail store) is different than the types of metadata 300 for a system table 154 representing internet protocol (IP) addresses. Each column 310 may include a specific data type. For example, one column 310 is associated with a "string" data type while another column 310 is associated with a "timestamp" data type, and yet another column 310 is associated with an "integer" data type.

The metadata associated with each data block 152 may be divided (e.g., by the metadata manager 160, by the remote system 140, by the user 12, etc.) into any number of system tables 154. This may reduce processing time for system queries 172 by allowing the metadata manager 160 to scan only a portion of the metadata 300 (i.e., only a portion of the system tables 154) for the query request 20. For example, when the query request 20 includes query parameters 21 associated with timestamps, the metadata manager 160 queries the system table 154 that is associated with timestamps while declining to query other system tables 154 that do not include timestamp metadata. The system tables 154 may group columns 310 of associated metadata 300 into the same system tables 154.

Referring now to FIG. 3A, the system table 154a includes columns 310 corresponding to Data Block ID 310a, Data Block Creation 310b, and Data Block Death 310c As discussed with reference to FIG. 2, each row 210 in the subset of rows 210a-n includes a corresponding data block ID 182 (located within the data Block ID column 310a) that provides the address for the associated data block 152 in the plurality of data blocks 152 of the data table 158. Here, each row 210 of the system table 154a reflects the time that the data block 152 became visible (i.e., was created) with the data block creation column 310b and the time that the data block 152 ceased to be alive (i.e., was deleted) with the data block death column 310c.

Referring now to FIG. 3B, the system table 154b includes columns 310 corresponding to Data Block ID 310a, Total Rows 310d, and Total Missing Rows 310e. Here, the Data Block ID column 310a is common across both system tables 154a, 154b to associate the data block 152a with the corresponding row 210 of each system table 154a, 154b. Each row 210 of the system table 154b also reflects the number of values in the data block 152 (with the Total Rows column 310d) and the number of rows with no values in the data block 152 (with the Total Missing Rows column 310e).

Figure 4A:
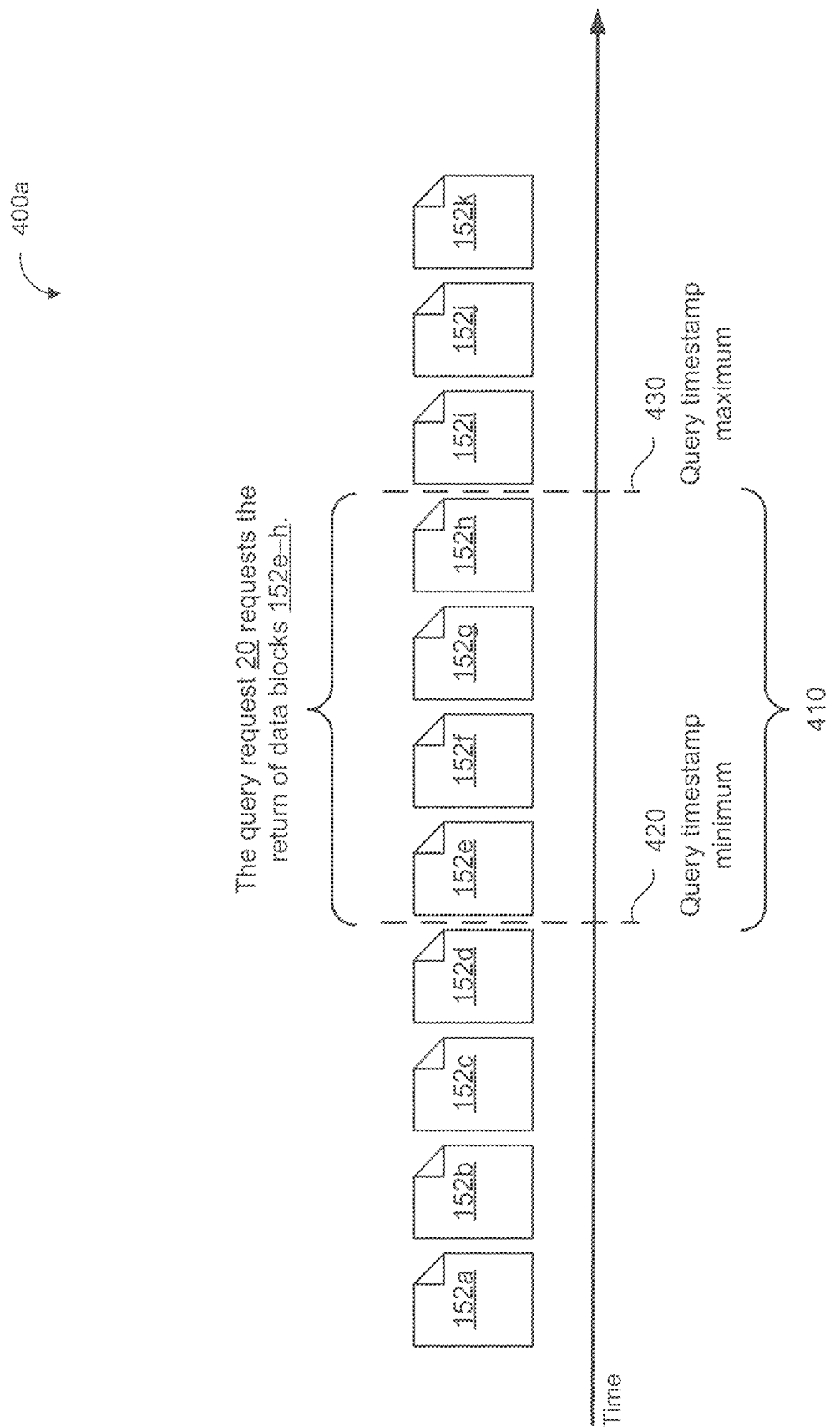

Referring now to schematic 400a of FIG. 4A, in some implementations, the metadata manager 160 determines whether any data blocks 152 in the subset of data blocks 152 from the data table 158 match the query parameters 21 of the query request 20 by generating falsifiable expressions based on the system query 172. Falsifiable expressions are derived expressions based on the filter expression of the query request 20 that include the property that, for data blocks where the falsifiable evaluates to true, the falsifiable expression guarantees that the data blocks do not match the query parameters 21 of the query request, and subsequently do not need to be scanned (i.e., may be pruned). Commonly, each data block 152 includes metadata 300 representing one or more timestamps. For example, the metadata 300 includes timestamps that indicate when the data block 152 was created, deleted, last modified, and last accessed, etc. In this example, the query parameters 21 of the query request 20 include a query timestamp range 410 that indicates a range in time that the remote system 140 should evaluate the data blocks 152 in the data table 158. That is, query timestamp range 410 indicates an earlier point in time and a later point in time that are both between the current time and a point in time when the data table 158 was created for use by the remote system 140 in evaluating each data block 152 when performing the query request 20. In this example, the query includes "SELECT SUM(LENGTH(string_field) from T WHERE timestamp_field BETWEEN '2019-05-21 12:30:00' AND '2019-05-22 21:30:00';" where "2019-05-21 12:30:00" is the earlier point in time and "2019-05-22 21.30:00" is the later point in time of the query filter range for the timestamp_field column.

Continuing this example, the metadata manager 160 generates a query timestamp minimum 420 based on the earlier point in time and a query timestamp maximum 430 based on the later point in time. The query timestamp minimum 420 is equal to the oldest timestamp of data blocks 152 to be evaluated for the query, and the query timestamp maximum 430 is equal to the newest timestamp (e.g., most recent) of the data blocks 152 to be evaluated. The data blocks 152a-k of FIG. 4A are shown in order based on the timestamp referenced by the example query with data block 152a associated with the oldest timestamp and data block 152k being the most recent. In this example, the metadata manager 160 must read or scan each of the data blocks 152 that fall between the query timestamp minimum 420 and query timestamp maximum 430. A naive implementation for processing the example query includes scanning each data block 152 (data blocks 152a-k in this example) of the data table 158 and determining (e.g., based on metadata stored within a header of the data block 152) whether the data block 152 should be further processed. However, because each data block 152 must be accessed and at least partially scanned and because the data table 158 may include millions or more data blocks 152, this naive approach is inefficient.

Referring now to schematic view 400b of FIG. 413, in some implementation, the system query 172 includes one or more falsifiable expressions. In these implementations, the metadata manager 160 generates the system query 172 by generating, for at least one conjunct of the query request 20, a falsifiable expression. By generating a falsifiable expression, data blocks 152 that evaluate to true (by the falsifiable expression) do not need to be scanned by the query request 20 in the data table 158. Optionally, the metadata manager 160 uses the conjunctive normal form (CNF) of a filter expression of the query request 20 to generate a falsifiable expression for each conjunct. That is, the metadata manager 160 generates the falsifiable expressions by replacing a column with the column's corresponding properties for a data block 152. Thus, each falsifiable expression has the property where, for a given data block 152, when the falsifiable expression evaluates to true, that data block 152 does not need to be scanned by the query request 20 (i.e., the data block 152 may be pruned).

Figure 4B:
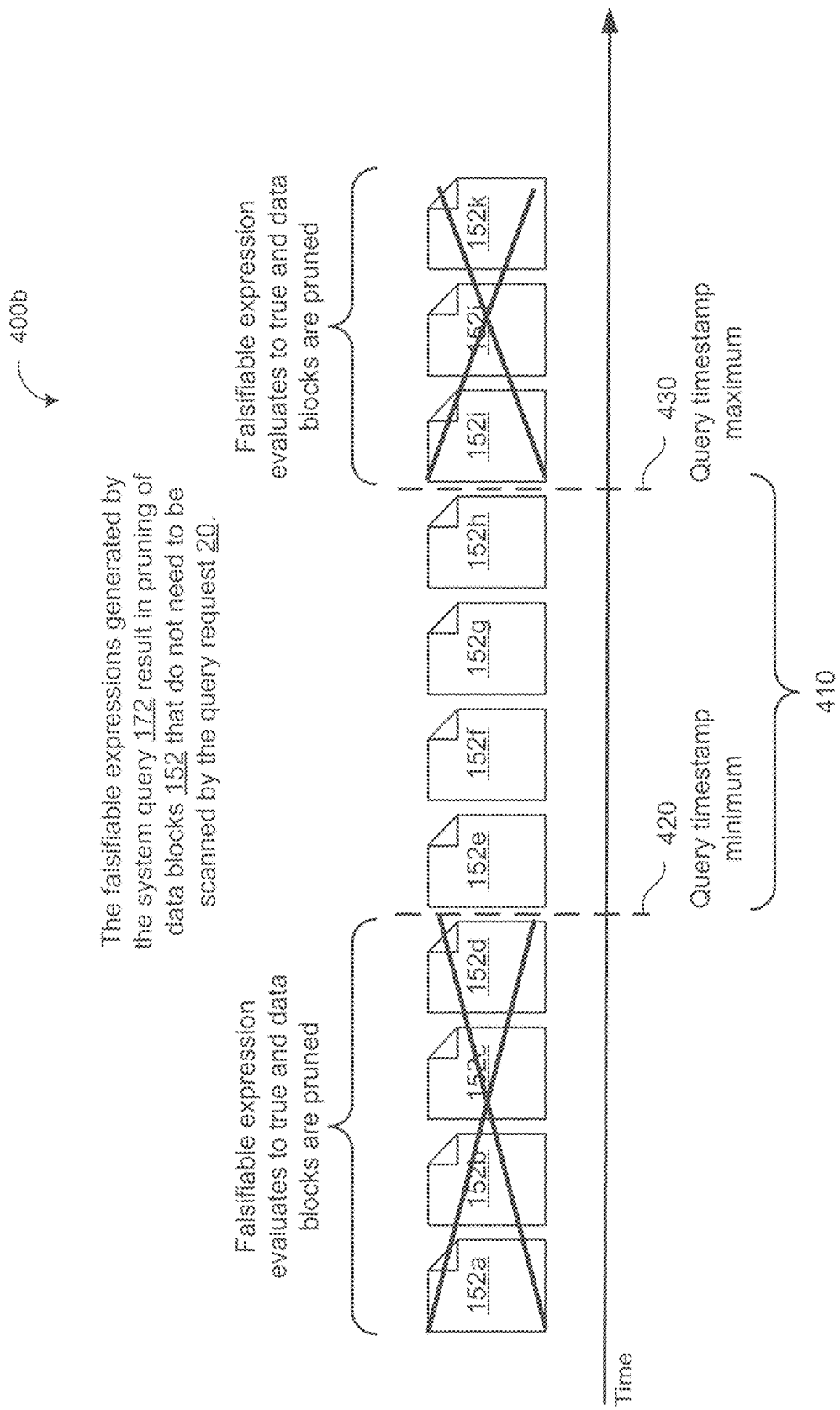

Continuing with the previous example, FIG. 4B shows the execution of the falsifiable expression based on the example query. Specifically, the metadata manager 160, using the filter "timestamp_field BETWEEN '2019-05-21 12:30:00' AND '2019-05-22 21:30:00'" from the example query, the falsifiable expression "timestamp_field.min_value>='2019-05-22 21:30:00' OR timestamp_field.max_value<='2019-05-21 12:3000'." In some examples, the metadata manager 160 transforms the falsifiable expression by negating the filter: "timestamp_field.min_value='2019-05-22 21:30:00' AND timestamp_field.max_value>='2019-05-21 12:30:00'."

Here, instead of scanning all of the data blocks 154a-k, the falsifiable expression is used to prune a portion of the data blocks 152. As shown, data blocks 152a-d and 152i-k evaluate to true, and are pruned (i.e., are not scanned by the metadata manager 160). By eliminating these data blocks 152, only data blocks 152e-h are scanned by the query request 20, greatly decreasing the processing time necessary to return the data blocks 152R that match the query parameters 21 of the query request 20.

In some implementations, the metadata manager 160 uses properties of functions of filters to determine falsifiable predicates. For example, the metadata manager 160, with the filter "DATE(TIMESTAMP_TRUNC(timestamp_field, MONTH)) BETWEEN '2017-05'01' AND '2017-07'01'," uses properties of the DATE and the TIMESTAMP_TRUNC functions to determine the falsifiable predicate. Specifically, for a given interval of values [X, Y] for timestamp_field, when the filter evaluates to true for both value X and value Y, the filter must evaluate to true for all values between X and Y. In other words, when the filter expression is monotonic in the interval [X, Y], then the filter may be converted to a falsifiable expression over the minimum and maximum value of the timestamp_field.

Continuing with this same example, the metadata manager 160 generates the falsifiable expression "DATE(TIMESTAMP_TRUNC(timestamp_field.min_value, MONTH))>='2017-05-01' OR DATE(TIMESTAMP_TRUNC(timestamp_field.max_value, MONTH))<='2017-07-01'." Again, the metadata manager 160 may negate the filter to generate the system query 172. This technique may be generalized with many other properties for data blocks 152. For example, the metadata manager 160 generates a falsifiable expression from the filter expression "DATE(timestamp_field) IS NOT NULL." For example, the falsifiable expression is "timestamp_field.total_values==timestamp_freld.total_missing_values."

Figure 5:
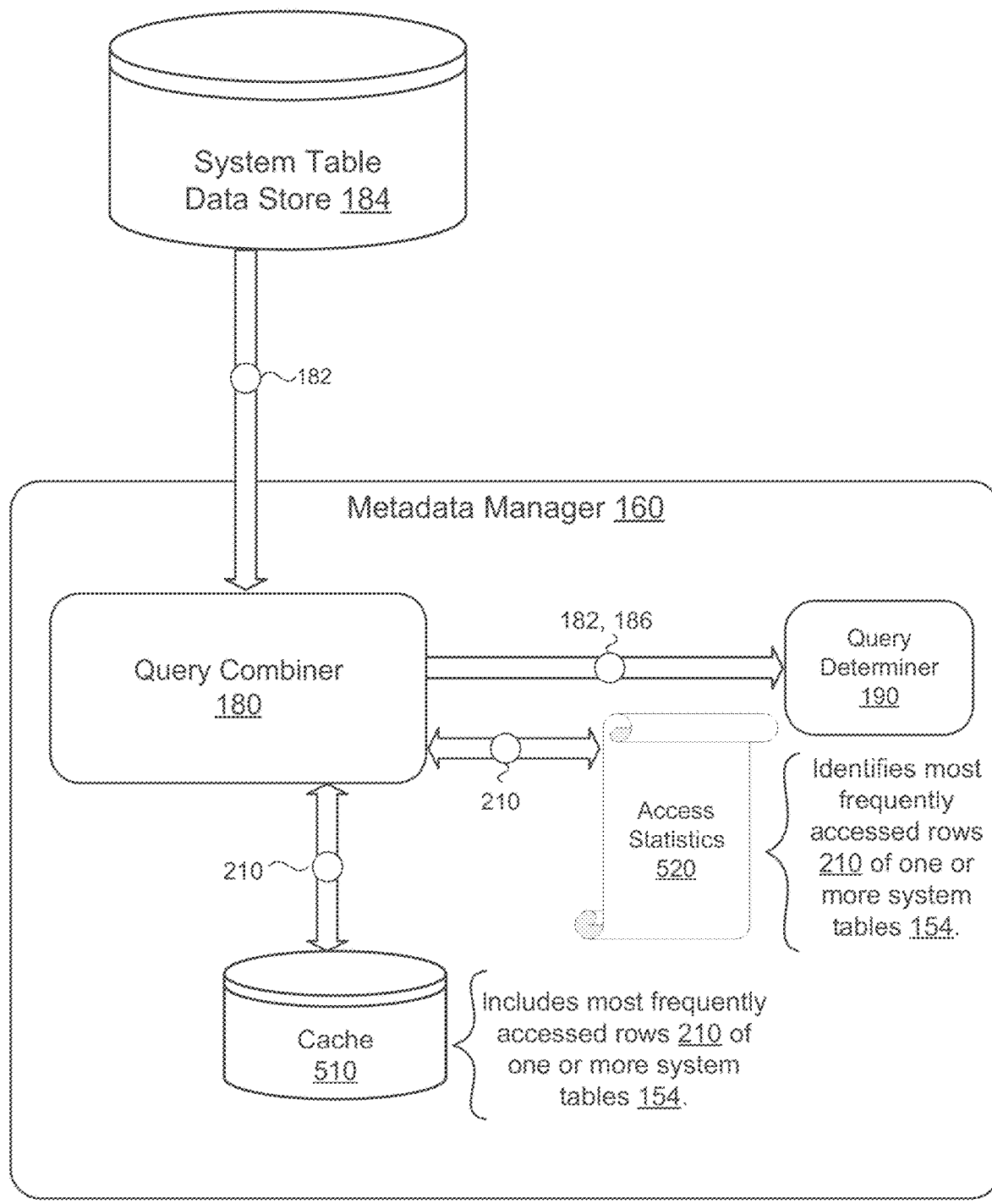
FIG. 5 is a schematic view of an example system for caching frequently used rows.

Referring to FIG. 5, in some implementations, one or more of the system tables 154 are cached in cache 510 (e.g., in high-speed volatile shared memory). In these implementations, the most frequently accessed rows 210 of the one or more system tables 154 are stored in the cache 510 to greatly increase access speed to these rows 210 versus rows 210 stored in the system table data store 184 (e.g., slower non-volatile memory). To achieve this, the metadata manager 160 maintains a log of access statistics 520 that indicates a frequency that query requests 20 access the respective row 210 of a respective system table 154 over a predetermined time period. For example, the access statistics 520 indicate that some rows 210 are never, or infrequently, accessed (e.g., weekly or monthly) by query requests 20 and other rows 210 are frequently accessed by query requests 20 (e.g., hourly, or daily).

The query combiner 180, while still executing the one or more query requests 20, adjusts the rows 210 cached in the cache 510 in real time based on the access statistics 520. In other words, when the system query 172 returns data block IDs 182 of the associated rows 210 in the subset of rows 210, the query combiner 180 updates the access statistics 520 to identify which rows 210 were accessed. The query combiner 180 may then update the cache 510 with the most frequently accessed rows 210 of the one or more system tables 154. That is, the query combiner 180 adjusts the cache 510 so that frequently accessed rows 210 are present in the cache 510 and less frequently accessed rows 210 are not present in the cache 510 in some implementations, updating the access statistics 520 and the cache 510 occurs in parallel. In other examples the query combiner 180 updates the access statistics 520 before updating the cache 510.

Figure 6:
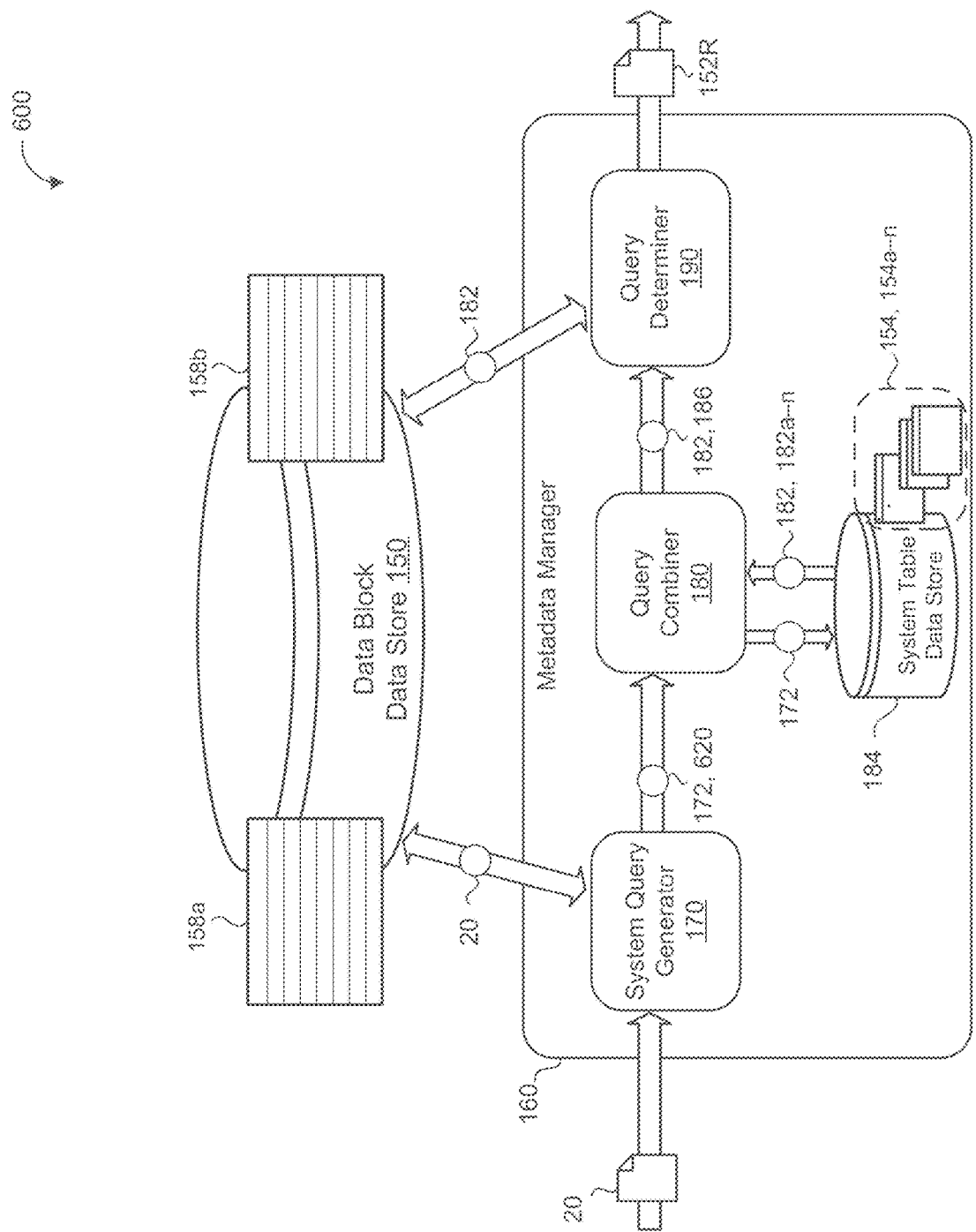
FIG. 6 is a schematic view of an example system for performing processing joins.

Referring now to FIG. 6, in some examples, the data block data store 150 divides the data blocks 152 into a plurality of data tables 158a-n to decrease the processing time needed to access a data block 152 in one data table 158 in the plurality of 1s data tables 158. For example, the data tables 158 stored at the data block data store 150 includes a fact data table 158a (e.g., a table of measurements, metrics, or facts) and an associated dimension data table 158b (e.g., a table that categorizes facts and measures) such as those commonly used in snowflake schemas. Typically, the dimension table 158b has a smaller number of data blocks 152 (e.g., data objects) than the fact data table 158a. Because of the size, the dimension data table 158b typically does not require parallel scans. In these implementations, the metadata manager 160 improves processing by first querying the dimension data table 158b and using the results to query the fact data table 158a. During execution of the query request 20, the system query generator 170 receives the query request 20 and queries, using the query request 20, the dimension data table 158b In these implementations, the query request 20 returns a range of values from the dimension data table 158b that the metadata manager 160 uses to generate a fact query 620 for the fact data table 158a.

Once the fact query 620 has been generated, the system query generator 170 generates the system query 172 based on the generated fact query 620 exactly as if the fact query 620 were explicitly included in the query parameters 21 of the query request 20. As such, the query combiner 180 receives the system query 172 and the fact query 620 from the system query generator 170 and generates the final query 186 including the system query 172 and the fact query 620. The query combiner then outputs the data block IDs 182 returned by the system query 172 and the final query 186 to the query determiner 190.

The query determiner 190 queries the fact data table 158a using the final query 186 (which includes the fact query 620) to return a subset of data blocks 152 that correspond to the data block IDs 182 of the associated rows 210 in the subset of rows 210. The query determiner 190 determines whether any data blocks 152R match the query parameters 21 indicated by the query request 20 by scanning each of the data blocks 152 that correspond with the data block IDs 182 generated by the system query 172. The query determiner 190, after scanning the data blocks 152 associated with the data block IDs 182, returns any data blocks 152R matching the query parameters 21 query request 20 to the user device 10.

Figure 7:
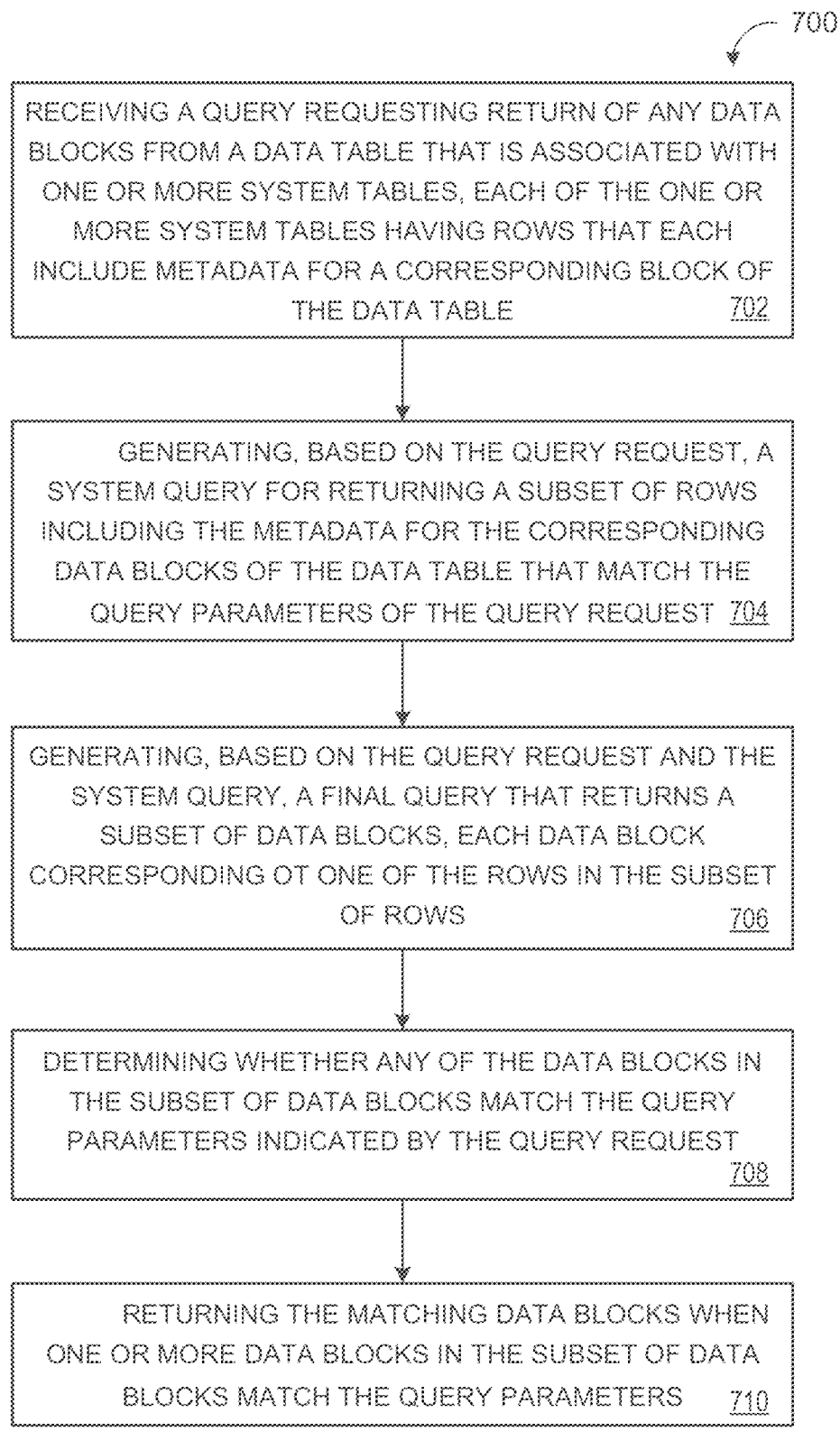
FIG. 7 is a flowchart of an example arrangement of operations for a method of managing big metadata using columnar techniques.

FIG. 7 is a flowchart of an exemplary arrangement of operations for a method 700 of using columnar techniques for big metadata management. The method 700 includes, at operation 702, receiving, at data processing hardware 144, a query request 20 requesting return of any data blocks 152 from a data table 158 that match query parameters 21. The data table 158 is stored on memory hardware 146 in communication with the data processing hardware 144 and associated with one or more system tables 154 containing rows 210 including metadata for corresponding data blocks 152. Each of the one or more system tables 154 having rows 210 that each include metadata for a corresponding data block 152 of the data table 158. At operation 704, the method 700 includes generating, by the data processing hardware 144, based on the query request 20, a system query 172 for returning a subset of rows 210 selected from the rows 210 of the one or more system tables 154. The subset of rows 210 including the metadata for the corresponding data blocks 152 of the data table 158 that match the query parameters 21 of the query request 20.

The method 700, at operation 706, includes generating, by the data processing hardware 144, based on the query request 20 and the system query 172, a final query 186 that returns a subset of data blocks 152 from the data table 158. Each data block 152 in the subset of data blocks 152 corresponds to one of the rows 210 in the subset of rows 210. At operation 708, the method 700 includes determining, by the data processing hardware 144, whether any of the data blocks 152 in the subset of data blocks 152 match the query parameters 21 indicated by the query request 20. At operation 710, the method 700 includes returning, by the data processing hardware 144, the matching data blocks 152R when one or more data blocks 152 in the subset of data blocks 152 match the query parameters 21.

Figure 8:
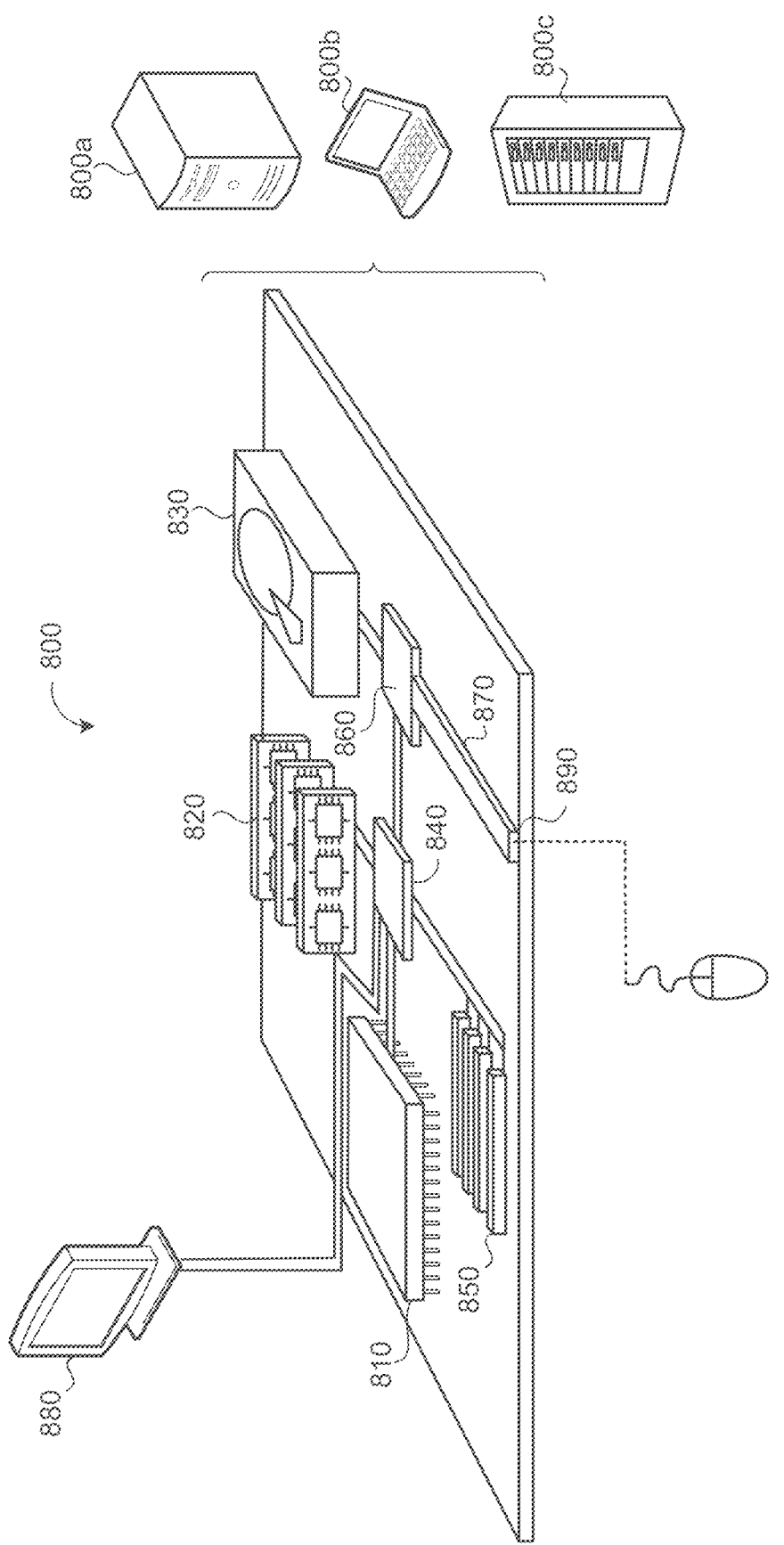
FIG. 8 is a schematic view of an example computing device that may be used to implement the systems and methods described herein.

FIG. 8 is a schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, a memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM. EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, a query request requesting return of any data blocks from a data table that match query parameters, the data table stored on memory hardware in communication with the data processing hardware and associated with one or more system tables, each of the one or more system tables having rows, each row of the one or more system tables comprising metadata for a single corresponding data block of the data table;
   generating, by the data processing hardware, based on the query request, a system query for returning a subset of rows selected from the rows of the one or more system tables, the subset of rows comprising the metadata for the corresponding data blocks of the data table that match the query parameters of the query request;
   generating, by the data processing hardware, based on the query request and the system query, a final query that returns a subset of data blocks from the data table, each data block in the subset of data blocks corresponding to one of the rows in the subset of rows;
   determining, by the data processing hardware, that one or more of the data blocks in the subset of data blocks match the query parameters indicated by the query request; and
   based on determining that one or more of the data blocks in the subset of data blocks match the query parameters, returning, by the data processing hardware, the matching data blocks.

2. The method of claim 1, wherein generating the final query comprises generating a semi-join of the query request and the system query.

3. The method of claim 1, wherein the system query comprises one or more falsifiable expressions.

4. The method of claim 3, wherein generating the system query comprises generating, for at least one conjunct of the query request, a falsifiable expression.

5. The method of claim 1, wherein the data table comprises a fact table and a dimension table, and wherein the query request filters the dimension table.

6. The method of claim 5, further comprising generating, by the data processing hardware, based on the query request, a fact query that filters the fact table.

7. The method of claim 1, wherein generating the final query that returns the subset of data blocks from the data table and determining whether any of the data blocks in the subset of data blocks matches the query parameters are interleaved.

8. The method of claim 1, wherein a portion of the one or more system tables is cached in volatile memory.

9. The method of claim 8, further comprising, determining, by the data processing hardware, based on access statistics, the portion of the one or more system tables cached in volatile memory.

10. The method of claim 1, wherein the data table is stored in a column-major format.

11. A system comprising:
    data processing hardware; and
    memory hardware in communication with the data processing hardware, the memory hardware storing instructions that when executed on the data processing hardware cause the data processing hardware to perform operations comprising:
    receiving a query request requesting return of any data blocks from a data table that match query parameters, the data table stored on the memory hardware and associated with one or more system tables, each of the one or more system tables having rows, each row of the one or more system tables comprising metadata for a single corresponding data block of the data table;
    generating, based on the query request, a system query for returning a subset of rows selected from the rows of the one or more system tables, the subset of rows comprising the metadata for the corresponding data blocks of the data table that match the query parameters of the query request;
    generating, based on the query request and the system query, a final query that returns a subset of data blocks from the data table, each data block in the subset of data blocks corresponding to one of the rows in the subset of rows;
    determining that one or more of the data blocks in the subset of data blocks match the query parameters indicated by the query request; and based on determining that one or more of the data blocks in the subset of data blocks match the query parameters, returning the matching data blocks.

12. The system of claim 11, wherein generating the final query comprises generating a semi-join of the query request and the system query.

13. The system of claim 11, wherein the system query comprises one or more falsifiable expressions.

14. The system of claim 13, wherein generating the system query comprises generating, for at least one conjunct of the query request, a falsifiable expression.

15. The system of claim 11, wherein the data table comprises a fact table and a dimension table, and wherein the query request filters the dimension table.

16. The system of claim 15, wherein the operations further comprise generating, based on the query request, a fact query that filters the fact table.

17. The system of claim 11, wherein generating the final query that returns the subset of data blocks from the data table and determining whether any of the data blocks in the subset of data blocks matches the query parameters are interleaved.

18. The system of claim 11, wherein a portion of the one or more system tables is cached in volatile memory.

19. The system of claim 18, wherein the operations further comprise, determining, based on access statistics, the portion of the one or more system tables cached in volatile memory.

20. The system of claim 11, wherein the data table is stored in a column-major format.

* * * * *